United States Patent

Wiedmann

[15] 3,660,599

[45] May 2, 1972

[54] METHOD OF AND CIRCUIT ARRANGEMENT FOR PICTURE TRANSMISSION USING MULTIPLEX TECHNIQUES

[72] Inventor: Heinz Wiedmann, Moglingen, Germany

[73] Assignee: International Standard Electric Corporation, New York, N.Y.

[22] Filed: June 29, 1970

[21] Appl. No.: 50,748

[52] U.S. Cl. ....................................178/6, 178/58, 178/6.8, 178/DIG. 23

[51] Int. Cl. ........................................H03n 7/08, H04n 7/14

[58] Field of Search .............179/2 TV; 178/DIG. 23, DIG. 3, 178/5.4 CD, 6, 6.8

[56] References Cited

UNITED STATES PATENTS

| | | | |
|---|---|---|---|
| 2,537,173 | 1/1951 | Szegho et al. | 179/2 TV |
| 3,352,966 | 11/1967 | Sawazaki et al. | 179/2 TV |
| 3,226,484 | 12/1965 | James | 178/DIG. 3 |
| 2,906,816 | 9/1959 | Kretzmer | 178/DIG. 3 |
| 3,472,951 | 10/1969 | Shimada et al. | 178/DIG. 23 |
| 2,308,381 | 1/1943 | Mertz | 178/DIG. 23 |

OTHER PUBLICATIONS

NASA Tech. Brief No. 67- 10576, Dated December 1967, " Multiplex Television Transmission System"

*Primary Examiner*—Robert L. Griffin
*Assistant Examiner*—Richard K. Eckert, Jr.
*Attorney*—C. Cornell Remsen, Jr., Walter J. Baum, Paul W. Hemminger, Charles L. Johnson, Jr., Delbert P. Warner and Marvin M. Chaban

[57] ABSTRACT

The method and circuit arrangement for transmitting video pictures over a telephone line using time division multiplex techniques. Signals are sent in both directions on the line, and the transmitted signals are stored in a delay section at the receiving end until a full picture has been received. Each picture is divided into two partial pictures or images, each capable of transmission within a discrete pulse or time slot. The partial picture received during one time slot is stored until the second partial picture is received during a subsequent time slot, thereby completing the picture. The complete picture may then be released from the receiving end to suitable picture processing or display equipment.

2 Claims, 8 Drawing Figures

Figure 1:
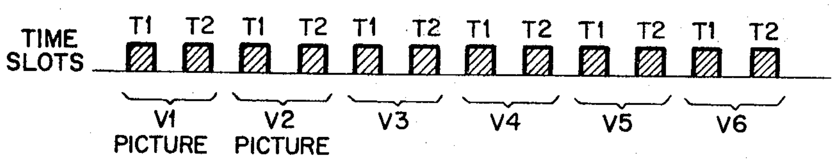

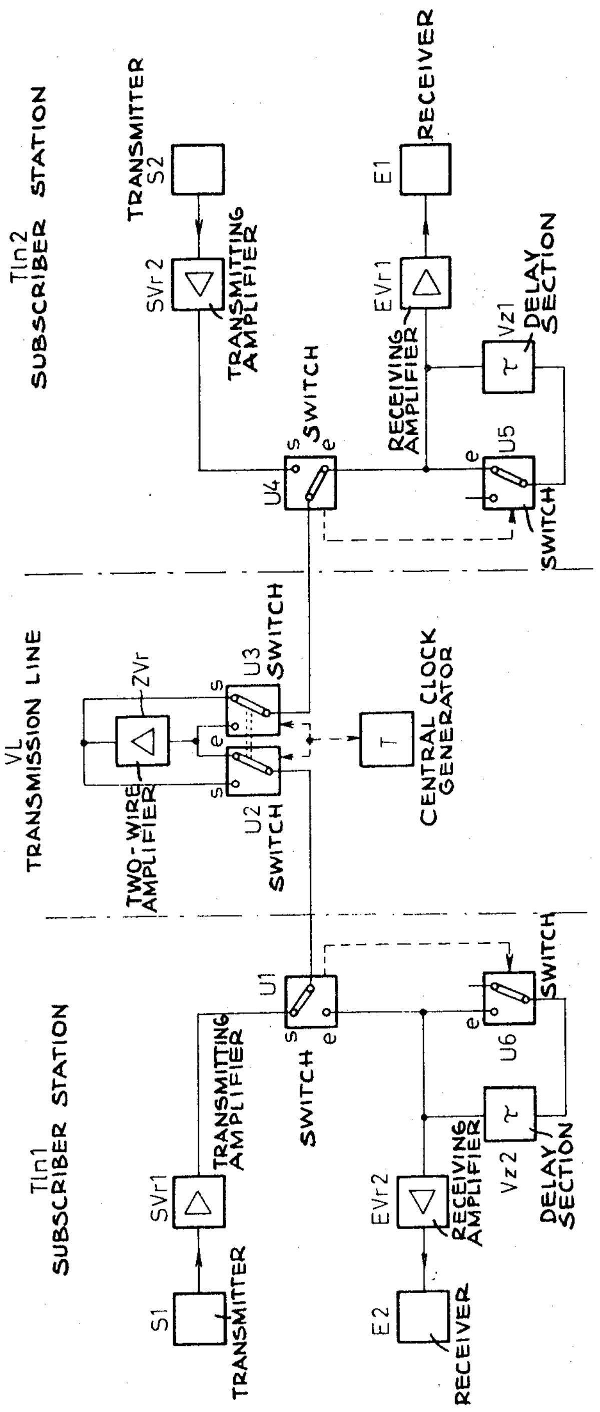
Fig.6
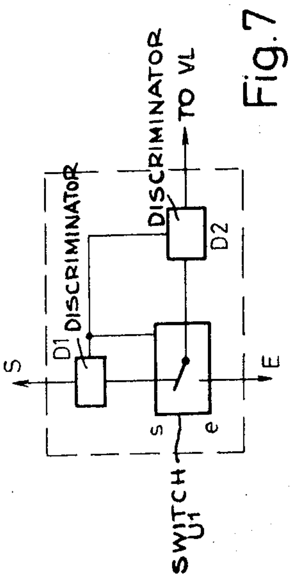
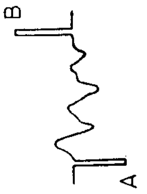
Fig.8

METHOD OF AND CIRCUIT ARRANGEMENT FOR PICTURE TRANSMISSION USING MULTIPLEX TECHNIQUES

This invention relates to a method of transmitting pictures in both directions through a single transmission line in television telephony and to a circuit arrangement for carrying said method into effect.

The picture transmission in conventional television telephones involves two separate transmission lines of which each one is used in only one direction. This method of picture transmission has the advantage that the associated transmission line may be continuously utilized for the transmission of video signals of one direction. Such a method allows for high frame frequencies such that the receiver obtains pictures which are free of flicker and provide a continuous reproduction of motion. The disadvantage of such a method is that two connecting lines are necessary at each terminal station and these have to be connected up through the crosspoint network.

It is an object of the invention to provide a method of and a circuit arrangement for picture transmission in television telephony, in which only one connecting line is used per terminal station and the received picture is nevertheless free of flicker. The method of transmitting pictures in both directions through a single transmission line in television telephony is characterized according to the invention in that the transmission of complete or partial pictures in both directions is effected by a time division multiplexing technique, the incoming complete or partial picture at each receiving end being recorded and simultaneously stored, the stored complete or partial picture being re-recorded during the period in which the next complete or partial picture is being transmitted in the other direction. The use of this intermediate storage technique at each receiving end achieves virtually the same picture quality as is obtained when continuously transmitting through two parallel transmission trunks, although the cost of line and coupling materials in the exchange system is reduced by one half.

According to the invention, the complete or partial pictures are stored most conveniently by means of delay sections having an appropriate delay time.

According to one embodiment of the invention the time division multiplexing operation on the single transmission line may be realized by dividing a complete picture into two partial pictures, the two partial pictures belonging to a complete picture being transmitted in immediate succession and the thus divided complete pictures being transmitted in one direction alternately with the thus divided complete pictures transmitted in the other direction, the delay periods of the delay sections being equal, at both receiving ends, to the duration of one complete picture. By dividing the complete picture into two partial pictures a higher frame frequency is achieved, which improves the picture quality. In order to reduce the delay period of the delay section, the time division multiplexing operation may be modified, according to a further feature of the invention, by dividing a complete picture into two partial pictures, transmitting the partial pictures in the two directions alternately and making the delay period of the delay sections at each receiving end equal to the duration of a partial picture, that is, to half the duration of a complete picture.

A circuit arrangement for carrying out the method of the invention is characterized in that the transmitters and receivers at each end of the transmission trunk are connected via a double-throw switch, that the video signal of a complete or partial picture has different clock-pulses at its leading and trailing edges and that these clock-pulses automatically control the said double-throw switch to cause it to assume the transmitting or receiving positions. The double-throw switch is such that discriminators are allotted to the double-throw switches at the inlet on the trunk side and the outlet on the transmitter side, which discriminators respond to the clock-pulses of the video signal, that the discriminator at the outlet on the transmitter side of the double-throw switch causes the switch to assume the transmitting position on receiving the leading edge of the video signal and to assume the receiving position on receiving the trailing edge of the video signal, and that the discriminator at the inlet on the trunk side of the double-throw switch causes the switch to assume the receiving position on receiving the leading edge of the video signal and to assume the transmitting position on receiving the trailing edge of the video signal.

To ensure that the delay sections only store the incoming pictures or partial pictures and not the outgoing ones, the delay sections are connected by series double-throw switches which are synchronously and positively controllable with the double-throw switches at the end of the transmission line.

The range of such a television telephone may be extended by the use of two-wire amplifiers. According to this embodiment, two-wire amplifiers are included in the transmission line, which amplifiers may be positively set in the correct transmitting direction by double-throw switches controlled by the clock-pulses of the video signal.

To prevent rupture of the transmission line in any direction a clock generator is allotted to the double-throw switches at a two-wire amplifier, which clock generator causes reversal of the position of the double throw switches if this position is maintained for longer than a predetermined period.

Figure 2:
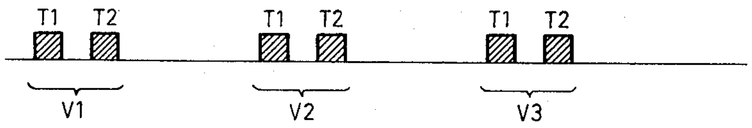
Figure 3:
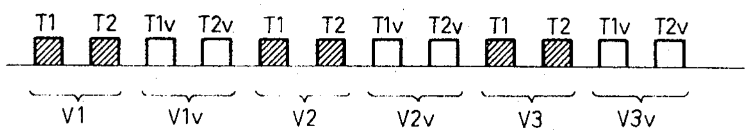
Figure 4:
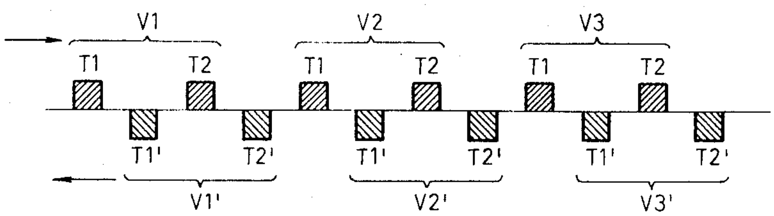
Figure 5:
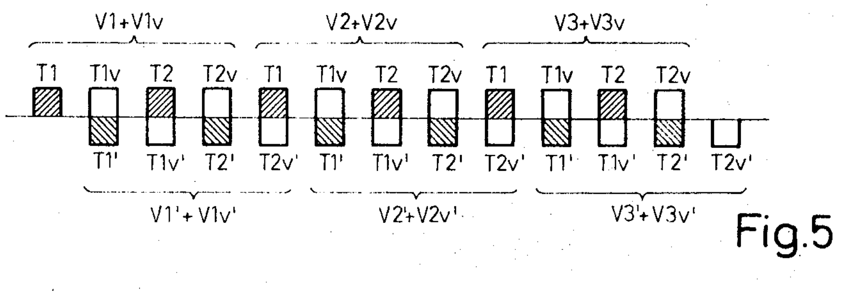

The invention is described below with reference to the accompanying drawings, in which:

FIG. 1 shows schematically the transmission of complete pictures in the form of partial pictures, FIG. 2 shows diagrammatically the partial and complete pictures transmitted in one direction along the transmission line, FIG. 3 shows diagrammatically the partial and complete pictures which are fed to one of the receivers after transmission and storage, FIG. 4 shows diagrammatically the alternating transmission of the partial and complete pictures transmitted in both directions along the transmission line, FIG. 5 shows diagrammatically the partial and complete pictures which are fed to both receivers after transmission and storage, FIG. 6 shows a basic circuit diagram of an arrangement for carrying out the method of the invention, FIG. 7 shows diagrammatically the construction of a double-throw switch as shown in FIG. 6, and FIG. 8 shows a video signal such as is used in the method of the invention.

As shown in FIG. 1, the complete pictures V1 to V6 are not transmitted as such, but are each divided into two partial pictures T1 and T2. There is thus obtained a high frame frequency for the partial pictures. The impression of flicker is thus greatly reduced. The full use of the transmission line for transmission in one direction only would give the best picture quality, but it would then be necessary to provide a separate transmission line for each direction.

To enable the video signals for both directions to be transmitted along a single transmission line, the invention makes use of time division multiplexing.

As shown in FIG. 2, only half of the transmission time is used for the transmission of pictures in one of the directions. The partial pictures T1 and T2 of any one complete picture V1 are transmitted in immediate succession. There is then a pause, during which the two partial pictures of a complete picture are transmitted in the other direction. Only then are two further partial pictures T1 and T2 of a complete picture V2 transmitted.

However, in order to achieve the full reception as illustrated in FIG. 1 at the receiver without raising the transmission rate or the band width, the invention provides temporarily restricted storage and re-recording of the partial pictures. As shown in FIG. 3, the incoming partial pictures T1 and T2 of the picture V1 are recorded on the screen and simultaneously stored by the storage units at one receiving end. After a time lapse corresponding to the duration of one complete picture V1 they are re-recorded on the screen in the form of partial pictures T1*v* and T2*v* of a complete picture V1*v*. Immediately thereafter the incoming partial pictures T1 and T2 of the complete picture V2 are recorded and stored, and so on. Thus the reception at the receiver corresponds to the conditions stipulated in FIG. 1.

As shown in FIG. 4, the partial pictures T1 and T2 transmitted in both directions may be alternately transmitted. The partial pictures T1 and T2 of the complete pictures V1 to V3, shown above the line, are transmitted in one direction while the partial pictures T1′ and T2′ of the complete pictures V1′ to V3′, shown below the line, are transmitted in the other direction. The transmission line is thus fully utilized.

As shown in FIG. 5, the non-cross-hatched partial pictures obtained by storage are inserted in the pauses occurring at the receivers, by means of a delay section having a delay time corresponding to the duration of one partial picture, that is, to half the duration of a complete picture. Thus, each receiver receives a continuous flow of partial pictures, each partial picture being repeated before the relevant other partial picture of the complete picture is recorded.

At one receiver, following the partial picture T1 the stored partial picture T1*v* is recorded on the screen. There then follow the partial picture T2 and the stored partial picture T2*v*. The complete pictures V1 to V3 thus alternate with the complete pictures V1 to V3*v*. The same applies in the counter-direction, as may be seen from the partial pictures T1′ and T1′*v* and T2′ and T2′*v* of the complete pictures V1′ to V3′ and V1′*v* to V3′*v*.

The basic circuit diagram shown in FIG. 6 illustrates means of picture transmission between the subscriber stations T1*n*1 and T1*n*2 via the single transmission line VL, in which the above-described time division multiplexing technique of the invention is positively carried into effect.

At the subscriber station T1*n*1 the transmitter S1 is connected by a transmitting amplifier SV*r*1 to the outlet *s* on the transmitter side of the double-throw switch U1. The outlet *e* on the receiver side of the double-throw switch U1 is connected by a receiving amplifier EV*r*2 to the receiver E2 and also by a double-throw switch U6 and a delay section V*z*2 to the receiving amplifier EV*r*2.

At the subscriber station T1*n*2 the transmitter S2 is connected by a transmitting amplifier SV*r*2 to the outlet *s* on the transmitter side of the double-throw switch U4. The outlet *e* of this switch U4 on its receiver side is connected by a receiving amplifier EV*r*1 to the receiver E1 and at the same time by a double-throw switch U5 and a delay section V*z*1 to the receiving amplifier EV*r*1.

The inlets on the line side of the double-throw switches U1 and U4 are connected to the transmission line VL.

Assuming that the video signal as shown in FIG. 8 has a clock-pulse A at its leading edge and a clock-pulse B at its trailing edge and that the double-throw switches U1 and U4 are as illustrated in FIG. 7, the new circuit arrangement operates as follows:

The double-throw switches U1 and U4 operate as follows: the discriminator D2 connected to the inlet on the line side of the switch causes the switch to assume the receiving position *e* when the leading edge A of the video signal is received and to assume the transmitting position *s* when the trailing edge B of the video signal is received. The discriminator D1 connected to the outlet on the transmitter side of the switch causes the switch to assume the transmitting position *s* when the leading edge A of the video signal is received and to assume the receiving position *e* when the trailing edge B of the video signal is received by said discriminator D1. The basic idea underlying this automatic path control by means of the clock-pulses A and B of the video signals is that each double-throw switch is twice informed of the position which it must be in when the next video signal is transmitted or received.

When the video signal is passing from the subscriber station T1*n*1 to the subscriber station T1*n*2 the double-throw switches assume the position shown in the FIG. 7. The leading edge A of the video signal coming from the transmitter S1 is picked up by the discriminator D1 of the double-throw switch U1 and causes the switch U1 to assume the position *s*, if it should not already be in that position, as may happen in the case of a fault. The trailing edge B of this video signal switches the double-throw switch U1 back to position *e*.

Assuming that the transmission line VL is connected through without any amplifier, the leading edge A of the video signal is picked up by the discriminator D2 of the double-throw switch U4 and causes the switch to assume position *e* and the double-throw switch U5 which is coupled thereto also assumes the same position. The incoming video signal passes through the receiving amplifier EV*r*1 to the receiver E1 and, after the necessary time lapse, is again received by the receiver E1 after passing through the double-throw switch U5, the delay section V*z*1 and again through the receiving amplifier EV*r*1. The trailing edge B of the video signal switches the double-throw switch U4 back to position *s* and thus switches off the delay section V*z*1 via the switch U5.

Then the transmitter S2 transmits a video signal through the transmitting amplifier SV*r*2 along the transmission VL in the counter-direction. The leading edge A of this video signal checks the already correct positioning of the double-throw switches in this direction. The discriminator D1 of the double-throw switch U4 also urges the switch into position *s*, and the position *e* at the double-throw switch U1 is also checked by the discriminator D2 and, if necessary, established. The trailing edge B of the video signal from the transmitter S2 switches the switch U4 back to position *e* and the switch U1 back to position *s*, so that both switches are now ready for transmission of the next video signal by the transmitter S1. The double-throw switch U6 and the delay section V*z*2 at the subscriber station T1*n*1 are constructed and controlled in the same way as the double-throw switch U5 and the delay section V*z*1 at the subscriber station T1*n*2.

These operations are repeated after each video signal. Each double-throw switch is checked and, if it is not already in the correct position, is set as required. Thus, the automatic control of the double-throw switches by the video signals provides high operational reliability. Faulty settings are therefore hardly possible.

The immediate reversal of the switch setting by the trailing edge of the video signal has the advantage that echoes can reach the receiver only after passing twice through the transmission line and are therefore highly attenuated. The double-throw switches at the delay sections ensure that the video signal is only stored once.

In order to increase the range of such television telephones, two-wire amplifiers ZV*r* may be included in the transmission line VL. These amplifiers may be automatically switched to the desired direction of transmission at any given time by means of two double-throw switches U2 and U3 of the kind described above. This switching is again effected by the clock-pulses A and B at the leading and trailing edges of the video signals.

A central clock generator T is allotted to the two-wire amplifier ZV*r* and this generator forces a reversal of the setting of the switches U2 and U3 if their position has not changed over a predetermined period, for example the duration of four partial pictures. This clock control prevents blockage of the transmission line. The double-throw switches U1 and U4 may be forced to change position in the same way.

What I claim is:

1. A circuit arrangement for transmitting pictures in both directions over a single transmission line from a first station to a second using time-division multiplex techniques, comprising: means at the receiving end for displaying and storing a partial received image, and means for controlling a secondary display of said image during transmission in the opposite direction, and recivers and transmitters at each end of the transmission line, a double-throw switch for connecting said receivers and transmitters to said transmission line, wherein the video signal of a complete or partial picture have different clock-pulses at its leading and trailing edges, said double-throw switches being responsive to said clock pulses to automatically switch the transmitters and receivers into the respective transmitting and receiving positions and wherein there are discriminators associated with the double-throw switches at the inlet on a line side and the outlet on a transmitter side, which discriminators respond to the clock-pulses of the video signal, a first of said discriminators at the outlet on the transmitter side of the double-throw switch causing the switch to assume the transmitting position on receiving the leading edge of the video signal and to assume the receiving position on receiving the trailing edge of the video signal, and a second of said discriminators at the inlet on the line side of the double-throw signal causing the switch to assume the receiving position on receiving the leading edge of the video signal and to assume the transmitting position on receiving the trailing edge of the video signal.

2. A circuit arrangement as claimed in claim 1, wherein there are delay sections connected by series double-throw switches which are synchronously and positively controllable with the double-throw switches at the end of the transmission line.

* * * * *